Nov. 16, 1937.  A. J. PORSKIEVIES  2,099,101
SPEED AND CUT-OFF INDICATOR FOR LOCOMOTIVES
Filed Sept. 28, 1934   2 Sheets-Sheet 1
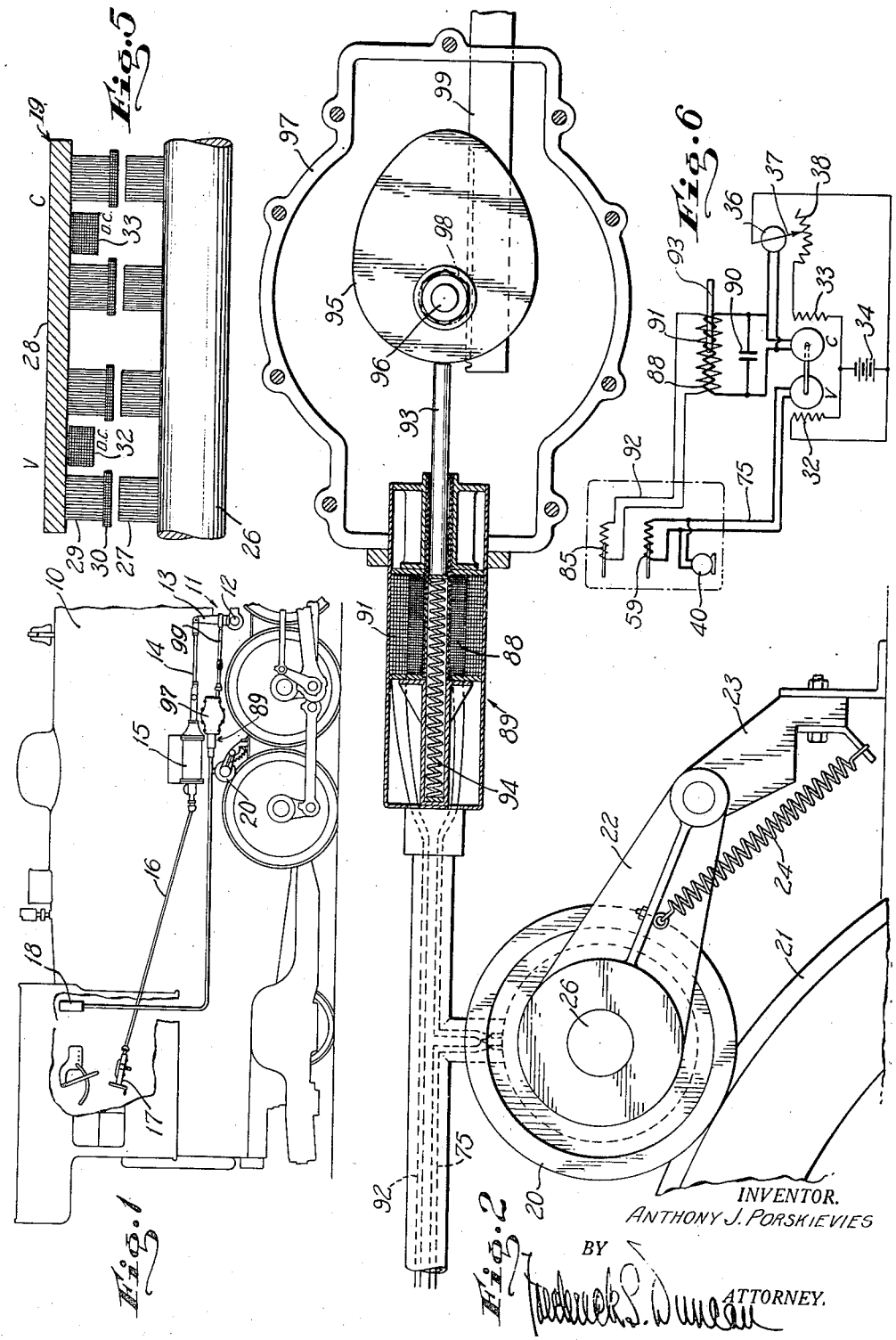
INVENTOR.
ANTHONY J. PORSKIEVIES
BY
Frederick P. Duncan
ATTORNEY.

Nov. 16, 1937.  A. J. PORSKIEVIES  2,099,101
SPEED AND CUT-OFF INDICATOR FOR LOCOMOTIVES
Filed Sept. 28, 1934  2 Sheets-Sheet 2

INVENTOR.
ANTHONY J. PORSKIEVIES
BY
ATTORNEY.

Patented Nov. 16, 1937

2,099,101

UNITED STATES PATENT OFFICE 2,099,101

SPEED AND CUT-OFF INDICATOR FOR LOCOMOTIVES

Anthony J. Porskievies, Atlantic Highlands, N. J., assignor to William Bell Wait, New York, N. Y.

Application September 28, 1934, Serial No. 745,863

6 Claims. (Cl. 105—48)

The present invention relates to apparatus for indicating the proper cut-off setting for a locomotive at different piston speeds.

A more specific object of the invention is to provide an indicator which may be located at any convenient point, for instance, in the cab of a locomotive, and which will indicate through electrical means the actual setting of the cut-off valve in relation to piston stroke.

A further object of the invention is to provide a combined electrically operated speedometer and cut-off indicator so correlated as to indicate the cut-off setting which will give maximum draw bar pull at various locomotive speeds.

I am aware of the fact that instruments of this general character have been in use heretofore but such instruments have had to employ mechanical power transmitting means extending from the tumbling shaft of the valve gear and from a wheel driven frictionally by a track wheel of the locomotive. It is an object of my invention to simplify such transmission of power by using electric rather than mechanical power transmission. As one means of carrying out this end I have devised a novel twin generator unit, one part generating current of constant voltage and the other part current which varies in voltage and frequency in proportion to the speed of the locomotive. The latter current is employed to actuate a speedometer while the former through means controlled by the cut-off valve gear operates the cut-off indicator.

Another object of the invention is to provide a novel variable transformer which may be mechanically actuated by connection with the valve gear to vary the induced secondary current which is employed to operate the cut-off indicator.

Other objects and advantages of my invention will appear in the following description of a preferred embodiment and thereafter the novelty and scope of the invention will be pointed out in the claims.

In the accompanying drawings:

Figure 1 is a fragmental view of a locomotive equipped with my improved speedometer and cut-off indicator, part of the cab of the locomotive being broken away to reveal certain control mechanism;

Fig. 2 is a view on a larger scale of a portion of Fig. 1 with certain parts shown in longitudinal section;

Fig. 5 is a somewhat diagrammatic fragmental view in longitudinal section of the twin generator unit; and Fig. 6 is a diagram of electrical connections.

Figure 4:
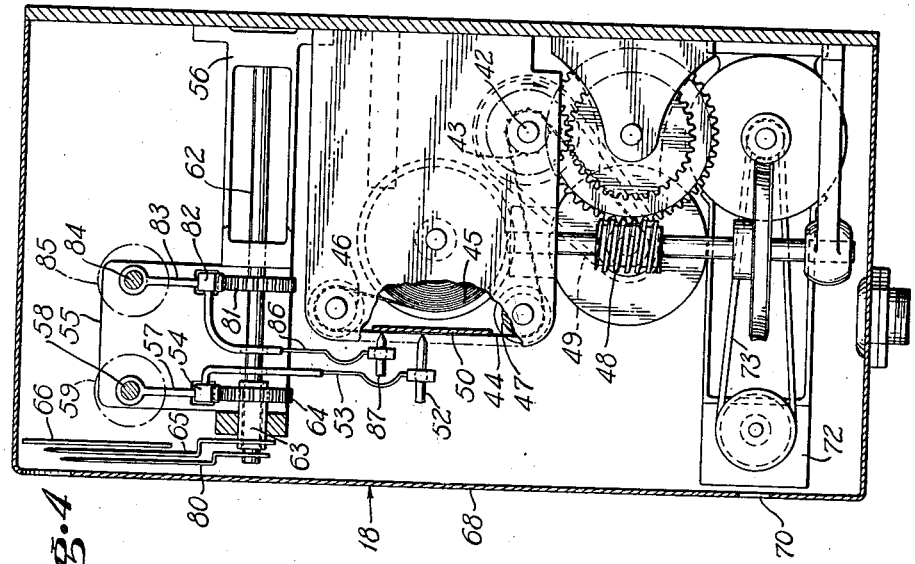
Fig. 4 is a view in section taken substantially on the line 4—4 of Fig. 3.

The locomotive 10 shown in Fig. 1 is provided with the usual valve-gear fragmentally indicated at 11 and including a tumbling shaft 12 on which is fixed a bell-crank 13 connected by a rod 14 to a power actuator 15, the latter being controlled through suitable connecting means 16 by a control wheel 17 in the cab of the locomotive. It is to be understood that this mechanism may be of standard construction.

Also mounted within the cab of the locomotive is an indicating and recording instrument 18 which, as will be explained presently, is adapted to indicate and record not only the speed of the locomotive, but, also the actual cut-off setting with respect to the speed indication. This indicating and recording instrument is electrically operated and to this end a generator unit 19 is provided of the single-phase alternating current inductor type which is driven by a traction wheel 20 that bears on one of the locomotive wheels 21. The traction wheel is carried by an arm 22 pivoted on a bracket 23 secured to the frame of the locomotive and a spring 24 urges the traction wheel against the locomotive wheel. The speed of the wheel 20 and consequently that of the generator unit will vary directly as the speed of the locomotive.

The generator unit 19 actually comprises two generators in one. One of the generators C generates current of substantially constant voltage, while output of the generator V varies in voltage with the speed of the locomotive. As indicated in Fig. 5, this twin generator unit comprises a rotor shaft 26 on which the traction wheel 20 is fixed. This rotor shaft is provided with the usual laminated pole pieces 27. The relatively fixed shell 28 of the generator is provided with laminated pole pieces 29 provided with field coils 30. There are two annular series of pole pieces 29 and two corresponding series of pole pieces 27 for each of the generators C and V. A direct current exciter coil 32 is shown between the pair of pole pieces 29 of the generator V and a corresponding exciter coil 33 is provided between the pole pieces 29 of the generator C. These coils 32 and 33 are separately supplied with direct current from a suitable source, such as the direct current generator commonly provided on locomotives. In the diagram, the source of direct current is conventionally indicated as a battery 34. The generator V which is excited by the coil 32 will have an output varying in frequency and voltage in direct proportion to the speed of the locomotive, and this output, as will be explained presently, is employed to operate speed indicating and recording mechanism in the instrument 18. The other generator C excited by coil 33 is intended to generate current of substantially constant voltage and to this end current is supplied to the coil 33 from source 34 through a voltage regulator. This voltage regulator may be of any well known type. In the diagram, Fig. 5, the regulator comprises a potentiometer 36 connected across the output circuit of the generator C and the potentiometer operates a contact arm 37 which sweeps across a rheostat 38 in the circuit of coil 33. By this means, as the speed of the locomotive increases and voltage of the output tends to rise, the current supplied to the exciter coil 33 is reduced and consequently the output voltage is maintained at a predetermined value.

Figure 3:
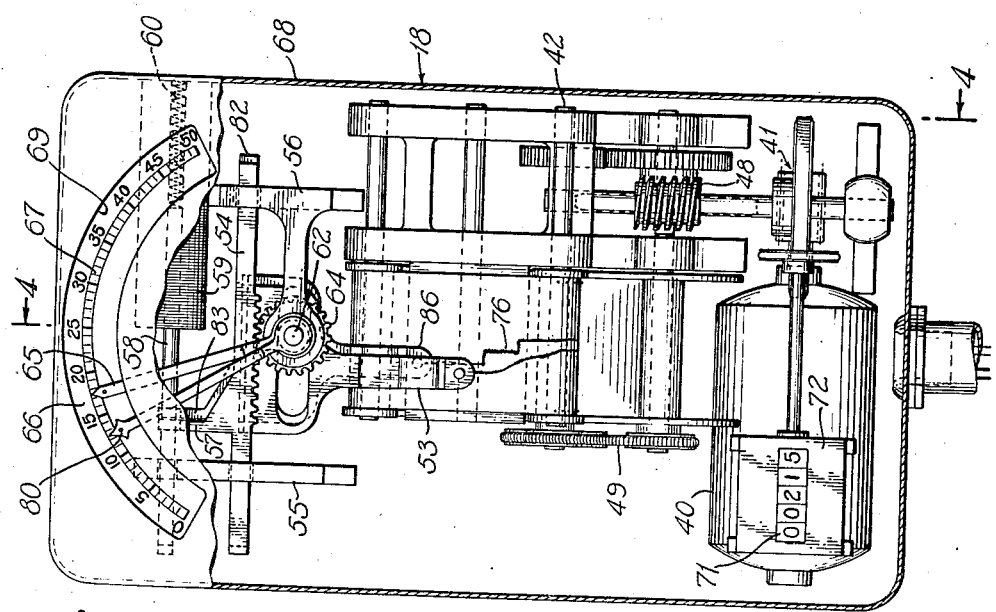
Fig. 3 is a view in front elevation of the indicating and recording instrument mounted in the locomotive cab, part of the front wall of the casing of the instrument being broken away to reveal interior details.

Referring now to Figs. 3 and 4, it will be observed that the instrument 18 comprises a variable speed motor 40 which drives, through suitable step-down gearing 41, a shaft 42. Fixed upon this shaft is a driving drum 43 preferably formed with teeth to engage and positively drive a tape 44. The latter is taken from a reel 45 and passes about a pair of rollers 46 and 47 before running to the driving drum 43. From the latter the tape runs to a take-up drum 48 which is flexibly driven through a slipping belt 49 by the shaft 42. Between the rollers 46 and 47 there is a platen 50 which serves as a backing for the tape to support the same as it is being marked by a speed stylus and a cut-off stylus.

The speed indicating stylus 52 is carried by an arm 53 depending from a rack 54. This rack is mounted to slide lengthwise in a direction transverse to that of the tape and to this end is suitably supported in brackets 55 and 56. The rack 54 is provided with an upwardly projecting arm 57 which is secured to the sliding core 58 of a solenoid 59. A spring 60 normally urges the solenoid outwardly and when the solenoid is energized it is pulled inwardly against the pressure of the spring to an extent determined by the degree of energization of the coil.

A shaft 62 is mounted in the bracket 56 transversely to the rack 54. Journalled upon the shaft 62 is a sleeve 63 which carries a pinion 64 which meshes with the rack 54. The outer end of the sleeve carries a hand 65 which is adapted to swing before the face of a dial 66 as the rack 54 is reciprocated by variations of energization of the solenoid 59. This dial may be suitably calibrated, as indicated at 67, in miles per hour or in any other desired units of speed. The front wall of the casing 68 of the instrument is formed with an arcuate window 69 through which the dial and the movement of the hand 65 with respect to the dial may be observed. Another window 70 is provided in the lower part of the front wall of the casing 68 to reveal the dial 71 of an odometer 72. The latter is driven by a belt 73 from a suitable element of the step-down gearing 41.

As shown in the diagram, Fig. 6, the motor 40 and the solenoid 59 are connected in parallel in the output circuit 75 of the generator V. Since the current in this circuit varies in frequency and potential in direct proportion to the speed of the locomotive the energization of solenoid will bear a direct ratio to the speed of the locomotive and this speed will be indicated by the position of hand 65 on dial 66. At the same time, since the tape 44 is driven by the motor 40 which also varies in speed in proportion to the speed of the locomotive, a speed curve 76 will be drawn upon the tape 40 to make a record of variations of speed of the locomotive.

As explained above it is desirable, for the sake of economy, to vary the instant position of the cut-off valve in accordance with the speed of the locomotive and the parts are so arranged that when the cut-off setting is adjusted for maximum draw bar pull at any given speed a cut-off hand 80 will directly overlie the speed indicating hand. The cut-off hand is fixed upon the shaft 62 which carries a pinion 81 fixed thereon. This pinion engages a rack 82, similar in form to the rack 54, which is mounted to slide in the brackets 55 and 56. The rack is formed with an upwardly projecting arm 83 secured to the sliding core member 84 of a solenoid 85. Depending from the rack 82 is an arm 86 which carries a stylus 87 bearing on the tape 44. The solenoid 85 tends to draw its core 84 inward against the action of a spring (not shown) in proportion to the energization of the solenoid and in this way the movements of the hand 80 and stylus 87 are controlled.

Energization of the solenoid 85 does not vary with the speed of the locomotive but is controlled instead by the angular position of the tumbler shaft and hence by the cut-off setting. The output of the generator C is employed to energize the primary coil 88 of a variable transformer 89. Preferably a condenser 90 is shunted across the terminals of the primary coil 88, as indicated in Fig. 6. The secondary coil 91 of the transformer is connected in series with the solenoid 85, through a circuit 92. The variable transformer is provided with a sliding core 93 (Fig. 2) which is normally pressed outwardly by a spring 94 against a cam 95. This cam is mounted on a shaft 96 in a suitable casing 97. A pinion 98 fixed on the shaft 96 is engaged by a rack 99 which in turn is coupled to the bell-crank arm 13 fixed on the tumbling shaft. Thus, as the arm 13 is moved to different adjustments for varying cut-offs, the cam 95 will be correspondingly rotated and this in turn will vary the position of the core 93 with respect to the primary and secondary windings 88 and 91 of the transformer 89. As a result of this cam adjustment of the core the output of the secondary transformer will be proportionately varied in potential and this, in turn, will affect the solenoid 85 causing the hand 80 and stylus 87 to move correspondingly. It will be understood that the cam is employed to compensate for differences in angular movement of the cut-off valve with respect to the valve operating gear, and also to correlate the cut-off indicator with the speed indicator, so that when the cut-off is set for maximum draw-bar pull at any speed, one indicator hand will overlie the other.

The operation of the apparatus will now be clearly understood. When the locomotive is being started from rest, it is necessary to supply a maximum draw-bar pull and hence the operator will work the reverse gear to keep the hand 80 as nearly as possible over the speed hand 65. As the locomotive gathers speed the hand 65 will travel across the dial 69 indicating the speed of the locomotive and the operator will turn the control wheel 17 to vary the cut-off setting accordingly. As long as the hand 80 overlies the hand 65 he will know that he is obtaining the maximum draw-bar pull. However, when the locomotive has reached the desired speed he should advance the cut-off so as to economize steam, the operator will therefore advance the hand 80 as far as possible without losing speed, by operating wheel 17 to adjust the setting of the valve gear. Within certain limits the further the hand 80 departs from the hand 65 in clockwise direction, as viewed in Fig. 3, the greater will be the saving of steam.

While I have described a preferred embodiment of my invention it will be understood that this is to be taken as illustrative and not limitative and that I reserve the right to make various changes in form, construction and arrangement of parts as may fall within the spirit and scope of the following claims.

I claim:

1. The combination with the operating gear for the cut-off valve of a locomotive, of an alternating current generator driven by a track wheel of the locomotive, means constructed and arranged to maintain such current at substantially constant potential, a movable hand, a solenoid adapted to move the hand, a transformer, electrical conductors connecting the generator and the primary coil of the transformer for energizing said coil, separate electrical conductors connecting the secondary coil of the transformer and the solenoid for energizing the latter, a movable core in the transformer for varying the inductive linkage between the primary and the secondary, and means for moving the core in predetermined relation to the instant setting of said gear to control the pull of the solenoid and thereby control the position of the hand correspondingly.

2. The combination with the operating gear for the cut-off valve of a locomotive, of an alternating current generator driven by a track wheel of the locomotive, means constructed and arranged to maintain such current at substantial constant potential, a movable hand, a solenoid controlling the position of the hand, a transformer, electrical conductors connecting the generator and the primary coil of the transformer for energizing said coil, separate electrical conductors connecting the secondary coil of the transformer and the solenoid for energizing the latter, a movable core in the transformer for varying the inductive linkage between the primary and the secondary coils, and a cam operatively connected to said gear for controlling the position of the core in accordance with the actual cut-off setting so as to control the pull of the solenoid and control the position of the hand correspondingly.

3. The combination with the operating gear for the cut-off valve of a locomotive, of a two-part electric generator, means for driving the generator at the track speed of the locomotive, one part of the generator having an output variable in proportion to the speed of the locomotive, a speed indicator operated by said output to indicate the speed of the locomotive in selected units, a cut-off indicator operated by the output of the other part of the generator, and means including a variable inductive linkage controlled by said gear for varying the latter output in such ratio that the cut-off indicator will indicate in terms of said units the speed at which each cut-off setting will effect maximum draw-bar pull.

4. The combination with the operating gear for the cut-off valve of a locomotive of a two-part electric generator, means for driving the generator at the track speed of the locomotive, one part of the generator having an output variable in proportion to the speed of the locomotive, a speed indicator operated by said output to indicate the speed of the locomotive in selected units, a cut-off indicator operated by the output of the other part of the generator, means including a variable inductive linkage controlled by said gear for varying the latter output in such ratio that the cut-off indicator will indicate in terms of said units the speed at which each cut-off setting will effect maximum draw-bar pull, a recording tape, a motor actuated by the first-named output to drive the tape in proportion to the speed of the locomotive, and means for making on the tape a record of the movements of said speed and cut-off indicators.

5. The combination with the operating gear for the cut-off valve of a locomotive, of a two-part alternating current generator, means for driving the generator at the track speed of the locomotive, one part of the generator having an output variable in frequency and voltage in proportion to the speed of the locomotive, an indicator operated by said output to indicate the speed of the locomotive in selected units, means constructed and arranged to maintain the voltage of the output of the other part of the generator at substantially constant value, a variable transformer, means for energizing the primary coil of said transformer by the latter output, a cut-off indicator, means for actuating the cut-off indicator by the secondary current of the transformer, and means controlled by said gear for varying the voltage of the secondary of the transformer in such ratio that the cut-off indicator will indicate in terms of said units the speed at which each cut-off setting will effect maximum draw-bar pull.

6. The combination with the operating gear for the cut-off valve of a locomotive, of a two-part alternating current generator, means for driving the generator at the track speed of the locomotive, one part of the generator having an output variable in frequency and voltage in proportion to the speed of the locomotive, an indicator operated by said output to indicate the speed of the locomotive in selected units, means constructed and arranged to maintain the voltage of the output of the other part of the generator at substantially constant value, a variable transformer, means for energizing the primary coil of said transformer by the latter output, a cut-off indicator, means for actuating the cut-off indicator by the secondary current of the transformer, means controlled by said gear for varying the voltage of the secondary of the transformer in such ratio that the cut-off indicator will indicate in terms of said units the speed at which each cut-off setting will effect maximum draw-bar pull, a recording tape, a motor actuated by the first-named output to drive the tape in proportion to the speed of the locomotive, and means for making on the tape a record of the movements of said speed and cut-off indicators.

ANTHONY J. PORSKIEVIES.